(12) United States Patent
Pradeep

(10) Patent No.: US 9,108,707 B2
(45) Date of Patent: Aug. 18, 2015

(54) SHARK REPELLENT SYSTEM

(76) Inventor: Anantha Pradeep, Piedmont, CA (US)

( * ) Notice: Subject to any disclaimer, the term of this patent is extended or adjusted under 35 U.S.C. 154(b) by 821 days.

(21) Appl. No.: 13/294,073

(22) Filed: Nov. 10, 2011

(65) Prior Publication Data
US 2013/0122762 A1 May 16, 2013

(51) Int. Cl.
| | |
|---|---|
| *B63C 9/00* | (2006.01) |
| *A01M 29/10* | (2011.01) |
| *A01M 29/24* | (2011.01) |
| *B63B 35/79* | (2006.01) |
| *B63C 9/20* | (2006.01) |
| *B63C 11/04* | (2006.01) |

(52) U.S. Cl.
CPC .................. *B63C 9/00* (2013.01); *A01M 29/10* (2013.01); *A01M 29/24* (2013.01); *B63B 35/79* (2013.01); *B63C 9/20* (2013.01); *B63C 11/04* (2013.01)

(58) Field of Classification Search
CPC ........................................ B63C 9/00
USPC ........................................ 441/80
See application file for complete search history.

(56) References Cited

U.S. PATENT DOCUMENTS

| | | | | |
|---|---|---|---|---|
| 7,238,075 | B2 * | 7/2007 | Brodsky ........................ | 441/80 |
| 7,572,160 | B2 * | 8/2009 | Halliday ........................ | 441/64 |
| 7,811,144 | B2 * | 10/2010 | Cavanaugh .................... | 441/80 |
| 2013/0122762 | A1 * | 5/2013 | Pradeep ........................ | 441/80 |

OTHER PUBLICATIONS

Huveneers, C., et al., "Effects of the Shark Shield electric deterrent on the behavior of white sharks (*Carcharodon carcharias*)". Sardi, Jun. 2012. Retrieved from the Internet: <http://www.sardi.sa.gov.au/__data/assets/pdf_file/0005/173876/Risk_Assessment_of_the_Shark_Shield_Report_-_FINAL_19_06_2012.pdf> (Accessed May 7, 2013) 61 pgs.

Primor, Naftali Dr., et al., "Structure and Mode of Action of the Shark Repellent Pardaxin". Retrieved from the Internet: <http://www.dtic.mil/dtic/tr/fulltext/u2/a195824.pdf> (Accessed May 7, 2013) 28 pgs.

* cited by examiner

*Primary Examiner* — Lars A Olson
*Assistant Examiner* — Jovon Hayes
(74) *Attorney, Agent, or Firm* — Kwan & Olynick LLP

(57) ABSTRACT

A light sequence generation system is provided on human associated aquatic objects such as surfboards, boogie boards, and kayaks to deter shark attacks. Light sources such as light emitting diodes (LEDs) are configured to emit sequences of pulses in arrangements and/or patterns that are unnatural to sharks. Batteries and/or capacitors may be used along with solar panels to power the light sources. The batteries and/or capacitors can also power electromagnetic repellents or may be completely shield to prevent attractant effects. The unnatural light sequence generation system can be used in conjunction with other chemical and electromagnetic repellents.

20 Claims, 4 Drawing Sheets

SHARK REPELLENT SYSTEM

TECHNICAL FIELD

The present disclosure relates to a shark repellent system.

DESCRIPTION OF RELATED ART

Conventional mechanisms for deterring or repelling sharks from attacking human associated aquatic objects such as surfboards and kayaks are limited. These human associated aquatic objects are often misidentified as shark prey. Some chemical repellents have been shown to be reasonably effective. Research in chemical repellents is ongoing and includes chemical scents synthesized to mimic the substances released by dead or dying sharks. However, chemical repellents constantly need to be replenished and are not especially practical for surfboard recreational usage. Other shark repellent mechanisms rely on electro-magnetism. Sharks have an electro-magnetic wave discerning sensory system known as the Ampullae of Lorenzini. The sensory system is capable of detecting minor changes in the intensity of electro-magnetic waves, such as those associated with contracting muscles. Some available mechanisms focus on creating electro-magnetic fields that repel sharks and/or cause spasms in shark snouts. However, there have been instances where these mechanisms are not effective or have actually attracted the bite of sharks.

Consequently, it is desirable to provide improved mechanisms for repelling and/or deterring sharks from attacking human associated aquatic objects such as surfboards, boogie boards, kayaks, wet suits, and their users.

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Figure 1:
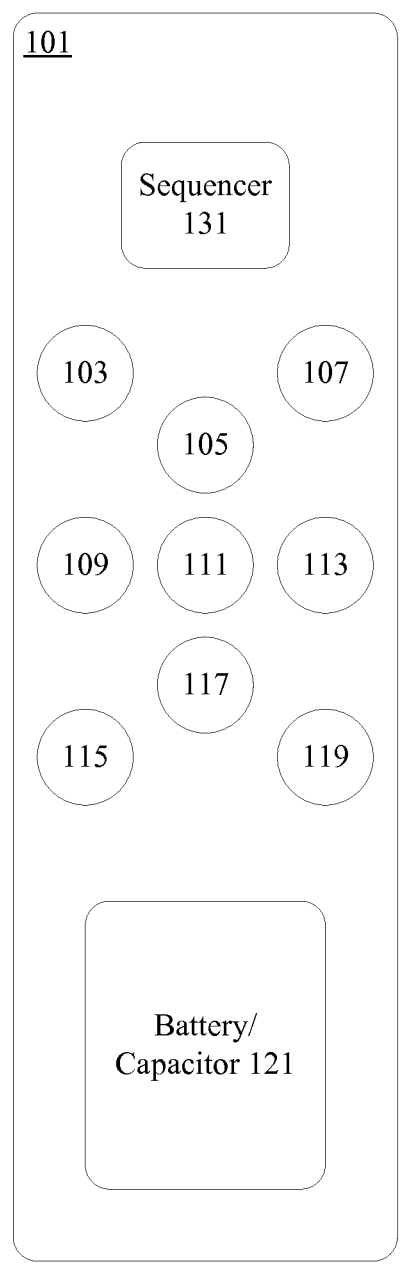
FIG. 1 illustrates a particular example of a human associated aquatic object.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular human associated aquatic objects such as surfboards, boogie boards, and kayaks. However, it should be noted that the techniques and mechanisms of the present invention apply to a variety of different human associated aquatic objects, including wet suits and flippers. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

A light sequence generation system is provided on human associated aquatic objects such as surfboards, boogie boards, and kayaks to deter shark attacks. Light sources such as light emitting diodes (LEDs) are configured to emit sequences of pulses in arrangements and/or patterns that are unnatural to sharks. Batteries and/or capacitors may be used along with solar panels to power the light sources. The batteries and/or capacitors can also power electromagnetic repellents or may be completely shield to prevent attractant effects. The unnatural light sequence generation system can be used in conjunction with other chemical and electromagnetic repellents.

Example Embodiments

Mechanisms are provided to deter shark attacks on human associated aquatic objects. Many varieties of sharks do not find humans to be the ideal prey. In many instances, sharks have been known to reject human flesh because it does not have the amount of blubber and fat that preferred prey tend to have. Consequently, most species of sharks do not actively seek out humans partaking in recreational activities such as surfing or kayaking, but it is believed that sharks often mistake humans on surfboards and kayaks to be seals or sea lions or other preferred prey.

Many efforts at deterring sharks have focused on chemical and electromagnetic repellents. Chemical repellents such as substances emitted from dead or dying sharks have proven to be effective. Sharks will avoid areas with dead or dying sharks. Although chemical repellents are effective, they are not particularly practical for small scale, recreational use.

Electromagnetic repellents create magnetic fields or electric potentials that may work to overwhelm the electroreception capabilities of many species of sharks. However, there have been instances where creation of electro-magnetic fields has stimulated aggressive activity in sharks. Consequently, the techniques and mechanisms of the present invention provide further shark repellents and deterrents. According to various embodiments, it is recognized that many species of sharks will often not attack humans scuba diving along side sharks. It is believed that sharks see humans as more of a curiosity than as a preferred prey. Furthermore, sharks do not like unnatural elements such as metal objects, polyurethane diving suits, scuba tanks, etc., that do not resemble natural prey.

The techniques and mechanisms of the present invention introduce additional unnatural elements to deter shark aggression. According to various embodiments, light sources such as light emitting diodes (LEDs) are attached or included on the underside of a human associated aquatic object. The light sources are configured to emit unnatural sequences of light bursts that indicate that the human associated aquatic object is not naturally occurring prey. In particular embodiments, light sequences are constructed to elicit states of hypnosis. A variety of unnatural sequences of flashing lights can be used to deter sharks. Although no light sequence may be a perfect deterrent or repellent to all species of sharks, some can be very effective and provide an additional unnatural indicator that may be used in conjunction with other shark repellents to reduce the risk of shark aggression.

It should be noted that using any type of light source to repel sharks is completely counterintuitive, as it is known that many sharks are attracted to light. Swimmers are warned to avoid wearing any reflective jewelry as the reflections may mimic those from the scale of a fish. Light sources also tend to indicate plankton growth and an abundance of fish. It is recognized however, that any light source can be configured to be sufficiently unnatural so that the deterrent effect overrides the attractant effect. In the same way chemical and electro-magnetic repellents may in fact be attractants if used in the wrong manner and in the wrong circumstances, unnatural light sequence repellent can also be an attractant if used in the wrong manner and in the wrong circumstances.

FIG. 1 illustrates one example of a human associated aquatic object. According to various embodiments, the human associated aquatic object 101 includes multiple light sources 103, 105, 107, 109, 111, 113, 115, 117, and 119. The light sources 103, 105, 107, 109, 111, 113, 115, 117, and 119 may be LEDs or sets of LEDs that are sufficiently powered for the particular type of water where the human associated aquatic object 101 will be used. The human associated aquatic object 101 also includes a battery/capacitor 121.

According to various embodiments, the battery/capacitor 121 is also used to power electro-magnetic repellents. In particular embodiments, the battery/capacitor 121 and associated wiring is completely shielded to prevent any shark attractant effects. According to various embodiments, a sequencer 131 is configured to control series of light flashes from the multiple light sources 103, 105, 107, 109, 111, 113, 115, 117, and 119. The sequences may show forms expanding from a central point and disappearing, or may flow in a particular direction. It is recognized that sharks are able to sense the presence of unnatural elements. Simple blinking lights may mimic reflections off the scales of schools of fish. By contrast, particular sequences are not present in nature and effectively convey the presence of unnatural elements.

In particular examples, light sources are switched on in an arrangement that mimics light flowing outwardly from a center point. In other examples, light sources are switched on in an arrangement that alternately flows back and forth. In still other examples, light sources are switched on in an arrangement that mimics a hypnotically twirling spiral. Some arrangements may be more effective for particular species of sharks in particular circumstances.

Figure 2:
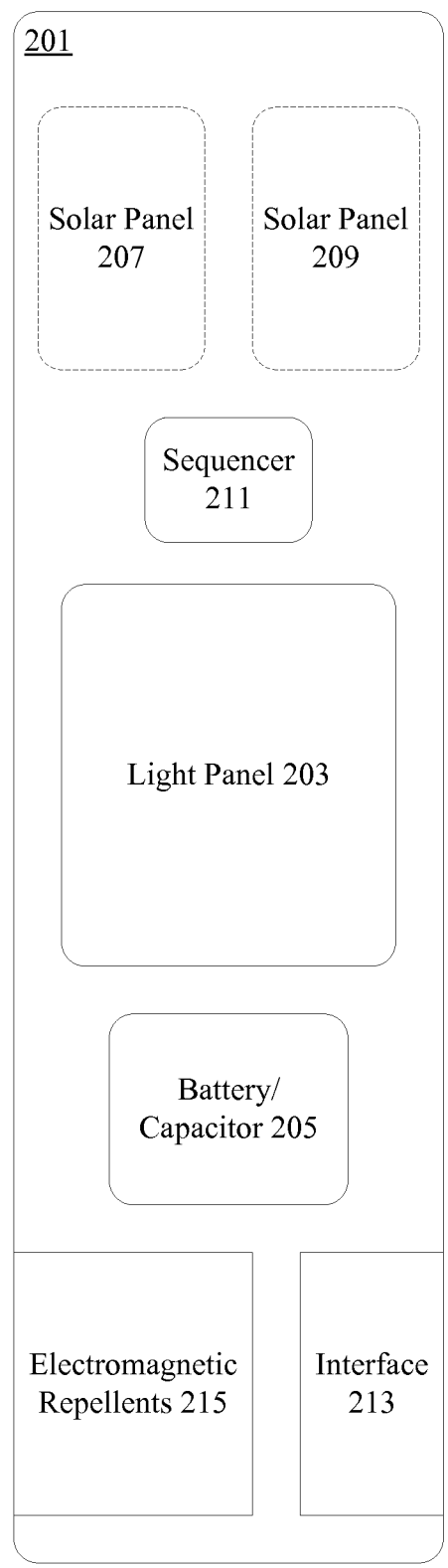
FIG. 2 illustrates a particular example of a human associated aquatic object.

FIG. 2 illustrates one example of a human associated aquatic object. According to various embodiments, the human associated aquatic object 201 includes a panel of light sources 203. According to various embodiments, the panel of light sources 203 is a panel or sheet of LEDs. The panel or sheet of LEDs may emit hundreds or many thousands of lumens. In some instances, a panel of light sources emits tens of thousands of lumens and is powered by a battery/capacitor 205 as well as solar panels 207 and 209.

According to various embodiments, the battery/capacitor 205 is also used to power electro-magnetic repellents 215. In particular embodiments, the battery/capacitor 205 and associated wiring is completely shielded to prevent any shark attractant effects. According to various embodiments, a sequencer 211 is configured to control series of light flashes from the panel of light sources 203. The light flashes are generated by sequencer 211 to represent artificial, non-natural phenomena. The sequencer 211 may be associated with an encoding interface configured to receive encoding programs for configuring light sequences and intensities effective for deterring particular types of sharks in particular conditions. The encoding interface may be consumer accessible through wired or wireless interfaces 213. Alternatively, encoding interfaces may also be accessible to vendors or merchants.

Figure 3:
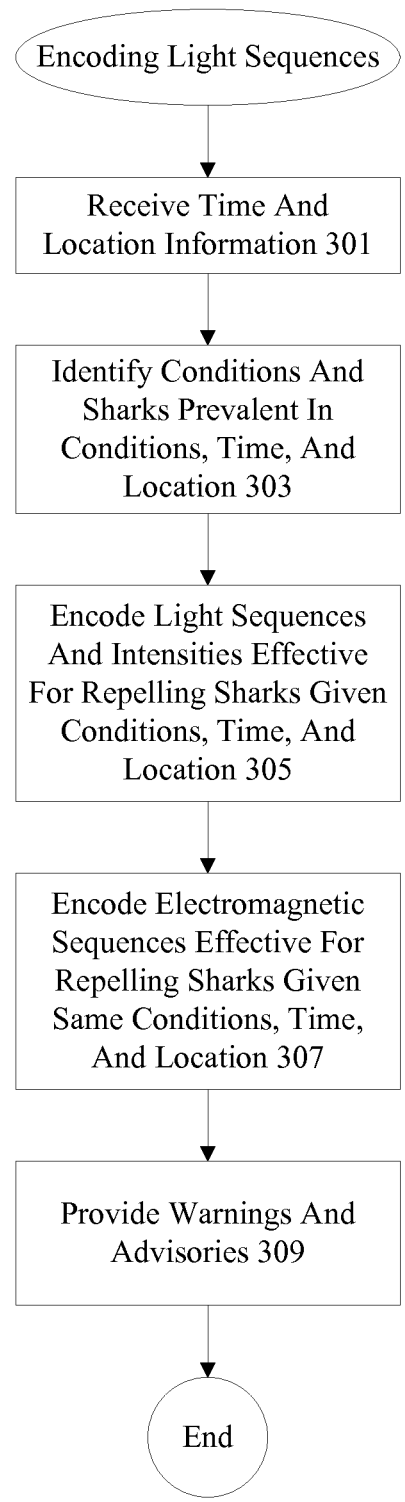
FIG. 3 illustrates a particular example of a technique for programming light sequences.

FIG. 3 illustrates one particular example of a technique for encoding light sequences and intensities through an encoding interface. According to various embodiments, an encoding system receives time and location information at 301 where a human associated aquatic object will potentially come into contact with sharks. The encoding system identifies ocean conditions and sharks prevalent in that particular time and location at 303. At 305, the encoding system encodes light sequences and intensities effective for deterring particular types of sharks. The encoding system may identify sequences that have been empirically determined to be effective in deterring or repelling particular types of sharks in particular conditions. According to various embodiments, the encoding system also encodes electromagnetic sequences at 307 that are effective in repelling particular types of sharks in particular conditions. In particular embodiments, warnings and various advisories are provided to the user at 309.

Figure 4:
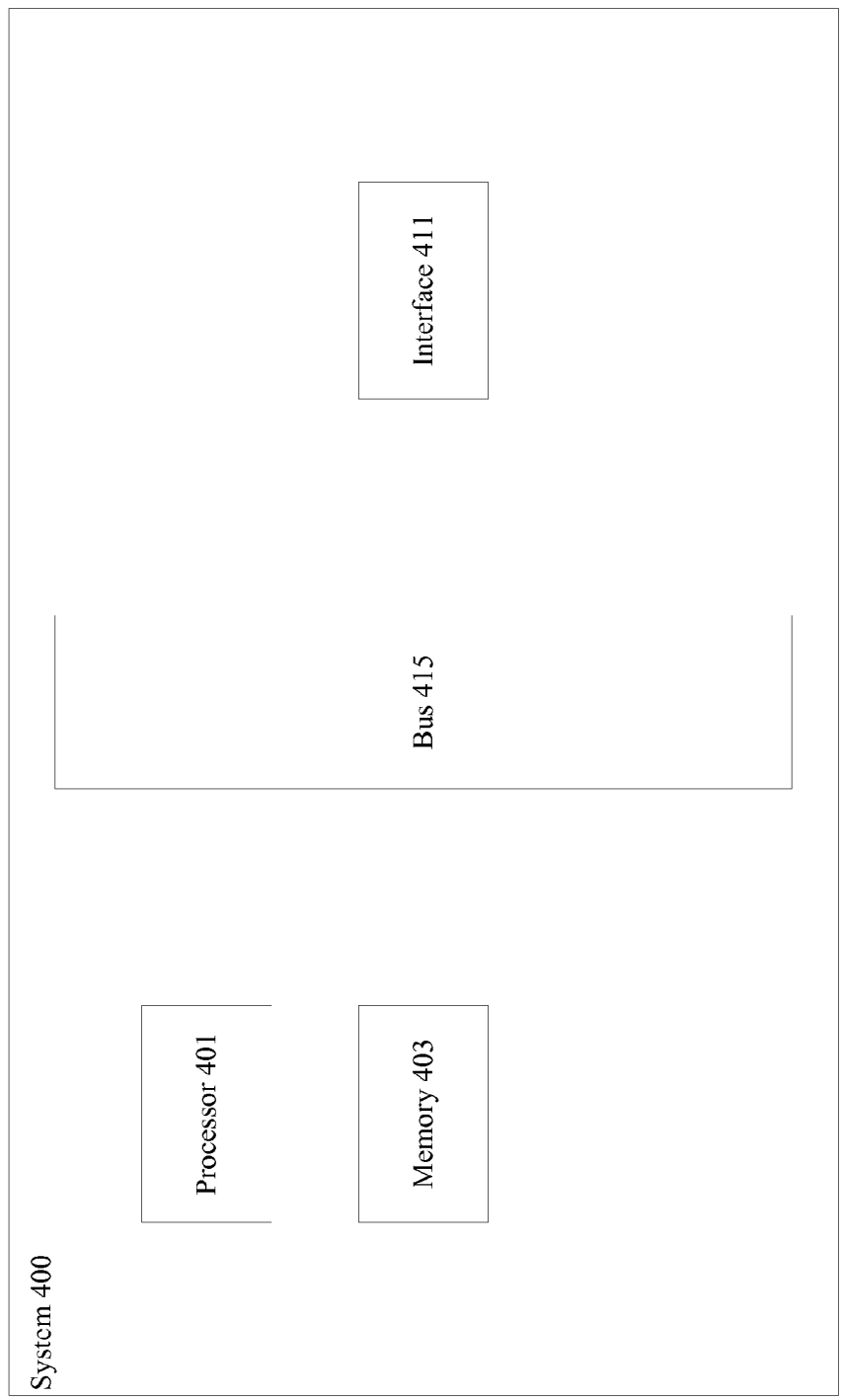
FIG. 4 illustrates a particular example of a system for programming light sequences.

FIG. 4 illustrates a particular example of a server that can be used to program or encode light sequences. A variety of devices and systems can implement particular examples of the present invention. According to particular example embodiments, a system 400 suitable for implementing particular embodiments of the present invention includes a processor 401, a memory 403, an interface 411, and a bus 415 (e.g., a PCI bus). The interface 411 may include separate input and output interfaces, or may be a unified interface supporting both operations. When acting under the control of appropriate software or firmware, the processor 401 is responsible for such tasks such as optimization. Various specially configured devices can also be used in place of a processor 401 or in addition to processor 401. The complete implementation can also be done in custom hardware. The interface 411 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 400 uses memory 903 to store data and program instructions and maintained a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method, comprising:
   receiving location and time information corresponding to potential shark exposure;
   identifying light sequences effective for repelling types of sharks that are more prevalent based on location and time information received;
   encoding the light sequences onto a human associated aquatic object, the human associated aquatic object including a plurality of light sources, wherein the light sequences are configured to portray non-natural phenomena.

2. The method of claim 1, wherein identifying light sequences comprises identifying light intensities.

3. The method of claim 1, wherein the light sequences include non-naturally occurring light sequences.

4. The method of claim 1, wherein location and time information includes water condition information.

5. The method of claim 1, wherein electromagnetic sequences effective for repelling sharks that are more prevalent based on location and time information received are also identified.

6. The method of claim 1, wherein the human associated aquatic object comprises a battery and/or capacitor.

7. The method of claim 6, wherein the human associated aquatic object further comprises solar panels.

8. The method of claim 7, wherein the human associated aquatic object is a wetsuit.

9. The method of claim 7, wherein the human associated aquatic object is a surfboard.

10. The method of claim 7, wherein the human associated aquatic object is a boogie board.

11. The method of claim 1, wherein the light sources are electromagnetically shielded.

12. A system, comprising:
    an interface operable to receive location and time information corresponding to potential shark exposure;
    a processor operable to identify light sequences effective for repelling types of sharks that are more prevalent based on location and time information received;
    wherein the light sequences are encoded onto a human associated aquatic object, the human associated aquatic object including a plurality of light sources, wherein the light sequences are configured to portray non-natural phenomena.

13. The system of claim 12, wherein identifying light sequences comprises identifying light intensities.

14. The system of claim 12, wherein the light sequences include non-naturally occurring light sequences.

15. The system of claim 12, wherein location and time information includes water condition information.

16. The system of claim 12, wherein electromagnetic sequences effective for repelling sharks that are more prevalent based on location and time information received are also identified.

17. The system of claim 12, wherein the human associated aquatic object comprises a battery and/or capacitor.

18. The system of claim 17, wherein the human associated aquatic object further comprises solar panels.

19. The system of claim 18, wherein the human associated aquatic object is a wetsuit.

20. An apparatus, comprising:
    means for receiving location and time information corresponding to potential shark exposure;
    means for identifying light sequences effective for repelling types of sharks that are more prevalent based on location and time information received;
    means for encoding the light sequences onto a human associated aquatic object, the human associated aquatic object including a plurality of light sources, wherein the light sequences are configured to portray non-natural phenomena.

* * * * *